Inventors:
Jean Lagasse
Georges Girard
BY Samuel L. Davidson
Attorney.

May 3, 1966  J. LAGASSE ETAL  3,249,849
REGULATION SYSTEMS
Filed June 22, 1961  8 Sheets-Sheet 2

Inventors:
Jean Lagasse
Georges Girart
BY Samuel Davidson
Attorney

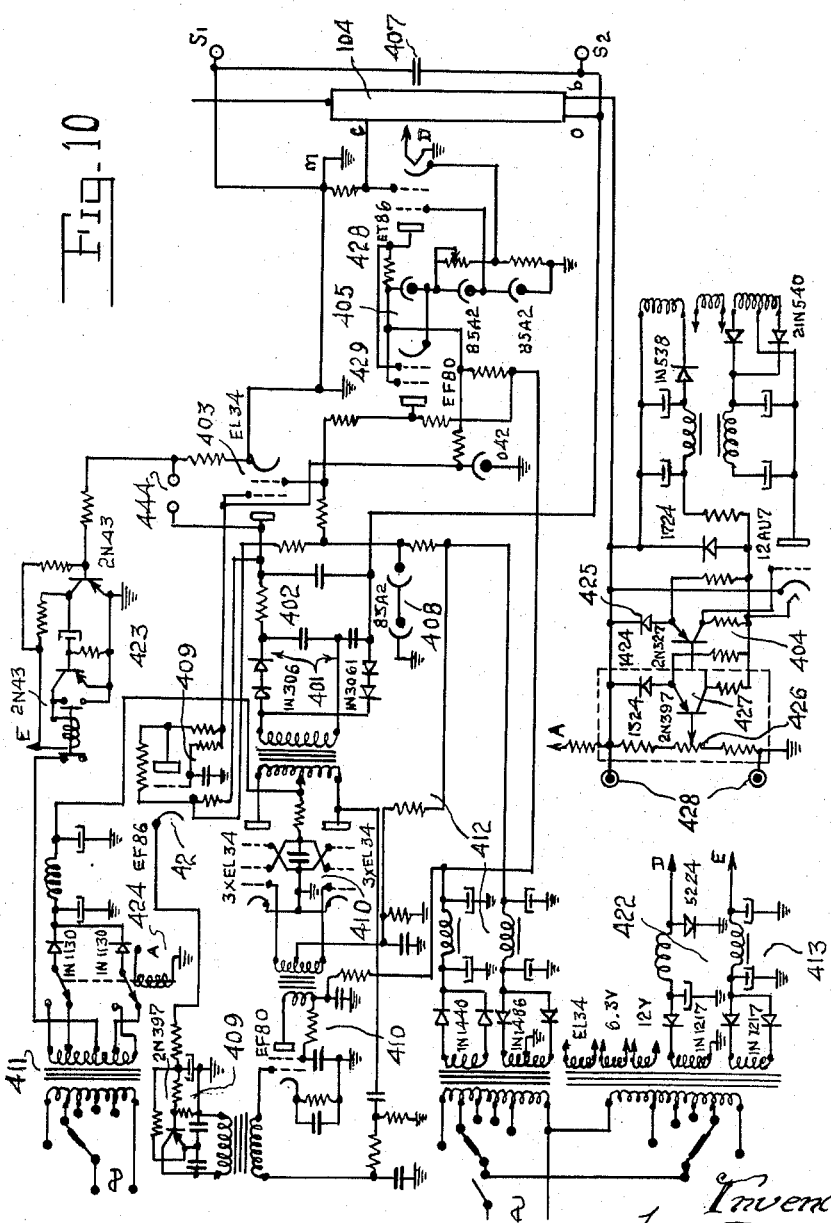

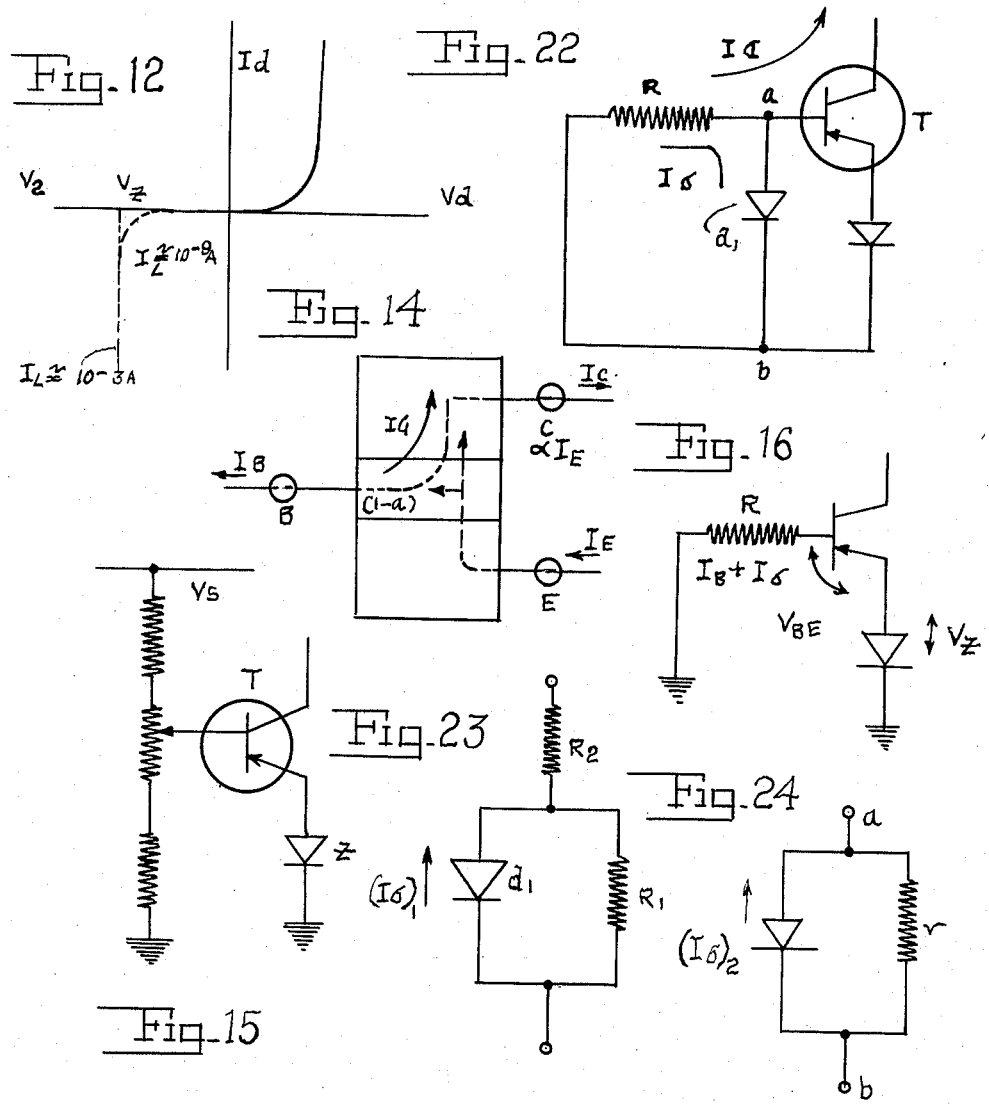

May 3, 1966  J. LAGASSE ETAL  3,249,849
REGULATION SYSTEMS
Filed June 22, 1961  8 Sheets-Sheet 8

Inventors:
Jean Lagasse
+ Georges Girart
BY Samuel L. Davidson
Attorney

United States Patent Office 3,249,849
Patented May 3, 1966

3,249,849
REGULATION SYSTEMS
Jean Lagasse, 12 Rue Edward Baudrimont, Toulouse, Haute-Garonne, France, and Georges Giralt, 12 Rue C, Balma, Haute-Garonne, France
Filed June 22, 1961, Ser. No. 143,261
14 Claims. (Cl. 323—22)

This invention relates to methods of, and apparatus for measuring and/or controlling continuous unidirectional or D.C. voltages. More specifically, the present invention relates to (1) methods of developing a measuring signal representative of the value of a continuous D.C. voltage, (2) apparatus for developing such a signal, (3) methods of producing regulated D.C. voltages, and (4) regulated D.C. voltage systems.

In accordance with prior techniques, when it was desired to obtain a direct voltage or current which was well-regulated or which possessed stable characteristics, one utilized a feedback type system incorporating a regulator and means for subjecting the regulator or feedback to comparison with, or control by, a reference voltage. Generally, prior systems of such type included a rectifier system to transform an applied alternating voltage into a unidirectional pulsating voltage, a filter system designed to smooth or reduce the residual undulation in the unidirectional pulsating voltage, a regulator device coupled with the output of the filter system, and a feedback chain adapted to compare the output from the regulator and across a load with a reference voltage whereby a correction signal was developed for application to, and adjustment of, the regulator.

For purposes of convenience, it has been standard practice heretofore to feedback only a part of the voltage appearing across the output. This was normally achieved by utilizing a potentiometer and obtaining the feedback voltage from the tap thereof. Moreover, it was common practice in prior systems to amplify the signal developed on comparison prior to feed of the same to the regulating device.

Rectifier and filtering devices incorporated in such prior systems as described above are of classic design. Similarly, regulators of various types are well-known and in general, such regulators represent a variable impedance such as an electronic tube or transistor which can be continuously adjusted by the application of a signal to an input terminal thereof. Of course, amplifiers used for purposes of amplifying the developed signal are also well-known, and reference sources of voltage or potential such as gas tubes and modern semi-conductors are familiar expedients to those versed in the art. Normally, in the prior systems the comparison is obtained by means of a potentiometer or resistance divider incorporating a sliding contact which permits adjustment whereby the comparison signal can be established with reference to any given value.

Systems of the aforesaid type inherently operate such that every modification of the reference voltage, every modification of the input voltage, and every variation of the feedback voltage acting through the potentiometer type comparison means displays itself by a proportional variation in the output voltage. By virtue of such operational characteristics of the prior systems, certain conditions must be met, first when one desires to obtain a perfectly constant output voltage, and secondly, when one desires to obtain an output voltage which can be regulated within a certain region. To obtain a perfectly constant output voltage, it is imperative that the reference source remain perfectly constant and that, at the same time, the voltage divider or potentiometer act in a definitely linear manner, i.e., that for any position given by the sliding contact on the potentiometer, the output voltage will be influenced only by eventual fluctuations from or in the output voltage. On the other hand, when it is desired to obtain an output voltage which can be regulated in a certain region, then there must be perfect linearity in adjustment of the reference voltage, or in adjustment of the comparison means, through for instance, displacement of the sliding contact of the potentiometer.

From the above discussion, it should be apparent that for good regulation it is essential to have a perfectly stable reference source which is not subject, for example, to the influence of temperature variation. Similarly, it is essential to have some type of a feedback means for regulation, which feedback means is capable of operation with high voltages, for example of the order of 5000 volts or above. While potentiometers are desirable, and while they function satisfactorily in comparatively low voltages, when comparatively high voltages are encountered, potentiometers have their weaknesses and drawbacks.

In addition to the foregoing, when one wished to assemble a system which provided for regulation over substantial range, then in order to provide for regulation in the aforesaid manner, it was necessary to incorporate a complex regulator section, and/or a regulator section consisting of a substantial number of elements proportional to the range desired to be covered. In other words, it was feasible with prior systems to provide for adjustment within a defined range while limiting the size or dimension of the regulator section, but it was virtually impractical to provide a wide range of variation because of the size and dimensions of the regulator section required.

The present invention has as its primary general objects the provision of systems for handling regulated D.C. voltages and/or measuring the same, which systems incorporate some of the classic elements such as rectifiers, filters and regulators, but are not subject to the aforesaid disadvantages. More specifically, a primary object of the present invention is to provide an improved method of developing a measuring signal representative of the value of a continuous D.C. voltage, which method eliminates the necessity for incorporating a variable resistance-type or potentiometer-type element. In this same connection, another primary object of the present invention is to provide an apparatus or system which enables the developing of a measuring signal of such type, and which may be used to carry out the methods of the instant invention.

Still, a further, primary object of the present invention is to provide an overall system for producing a regulated D.C. voltage across output terminals, which system operates linearly without regard to temperature variations, and which system provides a wide range of variation without requiring any complex regulator section.

With respect to the provision of a method of, and apparatus for developing a measuring signal representative of the value of a continuous D.C. voltage, still further, yet more specific objects of the present invention are: (a) to provide such a method which ultimately serves to yield a control or measuring signal by utilizing a portion of the output signal as stored on a capacitance means; (b) to provide a method as prescribed in sub-paragraph (a) which develops the control or measuring signal by comparing the charge stored on such capacitance means with a known charge upon application of such charges to a discharge path; (c) to provide such a system wherein coupling between the various capacitance means and the discharge path is achieved simultaneously; (d) to provide such a system wherein the discharge path serves to allow for comparison of small discharge currents developed within the system; (e) to provide an apparatus in which the aforesaid method of sub-paragraphs (a) through (d) can be achieved; (f) to provide an apparatus as prescribed above incorporating a main condenser means, impedance means providing the discharge path, means for alternately coupling the main condenser means to a conductor carrying the voltage to be measured or controlled and to the discharge path respectively, and means for applying a known signal to the discharge path of opposite polarity to that applied when the condenser means is coupled with the discharge path; (g) to provide such an apparatus which further includes amplifying means for converting the comparison or measuring signal developed into usable form; (h) to provide such an apparatus which incorporates co-functioning storage media or condenser means so as to eliminate the appearance of any variation in the system representative of the frequency of operation; (i) to provide such an apparatus further incorporating filtering means for providing a smooth and regulated comparison signals; (j) to provide such a system wherein simultaneous connections to be established are achieved through a pair of switching means having contact arms mounted on the same shaft for simultaneous operation; (k) to provide such an apparatus wherein the coupling necessary to operation thereof is achieved by electronic valve means and more specifically by gas tube or thyratron means; and (l) to provide such a system which may be assembled or fabricated from existing components and comparatively inexpensively.

With respect to a system for producing a regulated D.C. voltage across output terminals from an A.C. voltage supplied to input terminals thereof, the invention has as still further, and more specific objects the following: (a) the provision of a regulating system which is operative to control or regulate voltages of the order of 5000 volts or above; (b) the provision of such a regulating system which is not subject to variations with variation in temperature of the components thereof; (c) the provision of such a regulating system wherein power dissipation does not cause variations in regulation; (d) the provision of such a system which permits a wide range of variation, for example from zero to 50,000 volts, with any load current; (e) the provision of a system which can be utilized for regulation of continuous direct current voltages of low, middle, high, or very high values; (f) the provision of such a system which incorporates a double feedback chain which acts on the regulator device as well as on the input device so as to realize an optimalized system working with a maximum efficiency; (g) to provide such a device which has an improved output power and an improved current capacity over systems heretofore available; and (h) the provision of methods and apparatus conforming with all of the preceding objects of this paragraph, which methods and apparatus can be carried out with existing expedients assembled in accordance with the present invention and both inexpensively and conveniently.

While the instant invention is primarily concerned with the provision of regulation systems as discussed hereinabove, and while the invention provides for temperature compensation in such systems, it should be understood that temperature compensating methods provided hereby in themselves can constitute an important and individual aspect of this invention. Similarly, the provision of improved temperature compensated amplifying means and the provision of improved temperature compensated comparison systems constitute primary objects of this invention. More specifically, the invention includes within its objects the provision of transistor amplifiers or comparison means which are temperature compensated by diodes having a Zener effect, diode resistance networks and/or thermistor means used with such diodes and networks.

The invention lies in the construction, combination, and arrangement of the various systems, and in the steps of the various methods explained specifically in the following detailed description of illustrative and preferred embodiments hereof. Such description refers to the annexed drawings wherein FIGURE 1 is a schematic block diagram of an overall system assembled in accordance with the present invention, FIGURE 2 is a schematic equivalent transfer diagram of the circuit shown in FIGURE 1, FIGURE 3 is an overall block diagram of the preferred form of overall system provided by the present invention, FIGURE 4 is a schematic circuit diagram of one form of comparison device provided by the instant invention, FIGURE 5 is a schematic circuit diagram of another and the preferred form of the comparison device provided by the instant invention, FIGURE 6 is a schematic circuit diagram showing in some detail one coupling arrangement which can be used within a system constructed in accordance with the circuit of FIGURE 5, FIGURE 7 is a fragmental detailed view of one form of mechanical switching means which can be used in the system of FIGURE 6, FIGURE 8 is a circuit diagram presenting the circuit of FIGURE 3 as the same would appear when controlled by an electronic tube means, FIGURE 9 is a schematic circuit diagram presenting in the circuit of FIGURE 4 as the same would appear when controlled by an electronic gas tube means, FIGURE 10 is a detailed circuit diagram of an overall system constructed in accordance with the present invention.

FIGURE 10(a) presents one form of signal developing means which may be utilized in the overall system of FIGURE 10.

FIGURE 11 illustrates the principle of temperature compensated means which will be further described.

FIGURE 12 displays the transfer characteristic curve of an exemplary Zener diode.

FIGURE 13 presents a plot of Zener diode voltage versus changes in such voltage with temperature.

FIGURE 14 is a schematic diagram showing in sketch form operation of a PNP transistor.

FIGURE 15 is a schematic diagram of a section of an unproved comparison means, including the means providing a reference voltage therefor, preferably utilized in the system of the invention.

FIGURE 16 is an equivalent circuit diagram for that shown in FIGURE 15.

FIGURE 22 is a schematic diagram presenting an additional modification which can be made to the circuit of FIGURE 15 in accordance with the instant invention to effect temperature compensation particularly for variations in the inverse base collector current of the transistor utilized in the circuit of FIGURE 15.

FIGURE 23 presents the preferred form of circuit arm utilized in the circuit of FIGURE 22, and FIGURE 24 represents an equivalent circuit to that presented in FIGURE 23.

Figure 1:
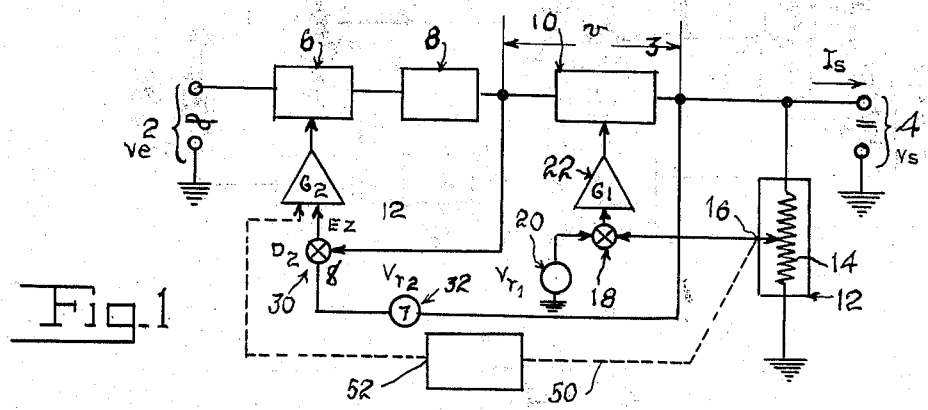

If reference is now made to FIGURE 1, it will be noted that the system shown therein serves to transform an alternating voltage applied across the input terminals 2 into a regulated direct voltage which appears across the output terminals 4. The system includes a rectifying means 6 coupled with the input terminals 2, a filtering system 8 coupled to the output of the rectifying system 6, and a regulator means 10 coupled to the output of the filter system 8 and with the output terminals 4.

The system further includes a signal developing means 12 coupled in parallel with the output terminals 4. The means 12 provides a feedback signal which represents a given proportion of the output voltage appearing across the terminals 4. More particularly, the signal developing means 12 may comprise, in accordance with standard practice, a potentiometer 14 having a sliding contact 16 cooperating therewith, or alternately, it may comprise an improved means of the type provided hereby and explained in more detail below. However, for purposes of the instant description, the means 12 is shown as comprising a rheostat 14 having a sliding contact 16 thereon.

In the system of FIGURE 1, upon adjustment of the contact 16, a feedback voltage is fed to a comparison device 18 which serves to compare the voltage fed back from the potentiometer with reference voltage supplied by the reference source 20. When there is a difference between the voltage fed-back and the reference source, then a signal is applied to the amplifier 22 which in turn adjusts the regulator means 10. Accordingly, the first regulator or feedback chain comprising the signal developing means 12, the comparison means 18, the reference source 20, and the amplifier 22 serves to compensate, through the regulator means, for any variations in the output voltage.

In accordance with the invention, there is provided a second regulatory chain which acts on or through the rectifying system 6. Coupled across the regulator 10 is the comparison means 30. This comparison means detects any difference between the voltage $v$ appearing across the regulator means and a second reference source 32. When a difference is observed by the comparison means 30, then a signal is applied to the amplifying means and in turn an increased or decreased output, as the case may be is supplied from the rectifying means 6, for example through control of the firing period of a rectifying thyratron.

With the provision of the second regulatory chain as described, the voltage across the regulator means is adjusted to a predetermined optimum value close to the value of the second reference source 32. In essence, the first regulatory classical chain provides a fine adjustment, and the second regulatory chain provides a maximum efficiency of the series regulator means.

According to the invention, the system further can include a third regulatory chain which comprises the mechanical connection represented by the dotted line 50, and a control element 52. The function of the third regulatory chain is to relieve the second regulatory chain for operation during periods when adjustment of the output voltage is desired. In other words, as opposed to having the second regulatory chain act during an adjustment, the third regulatory chain, which includes a suitable electro-mechanical disconnecting control element, makes easier the working of the second regulatory chain.

To recapitulate, in the system of FIGURE 1, the first regulatory chain comprises a classical standard regulator feedback network which insures the subordination of the output voltage to the reference source 20. The second regulatory or feedback chain acts upon the rectification stage of the system so as to maintain the voltage at the terminals of the regulator at a value compatible with the characteristics of the regulatory organ. The second regulatory chain acts independently of the first regulatory or feedback chain. The third regulatory chain serves to relieve functioning of the second regulatory chain during the adjustment period, i.e. when the slider on element 14 is being adjusted, for example.

Figure 2:
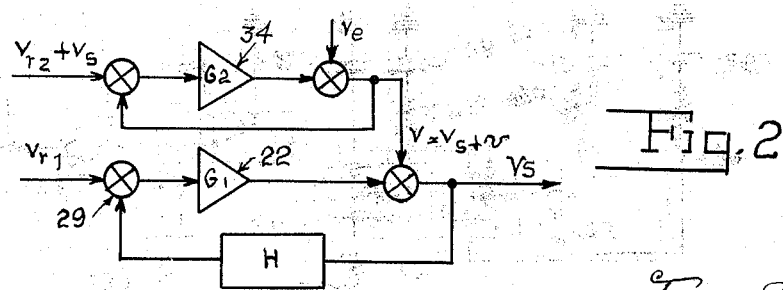

The operation of the system of FIGURE 1 can be better understood by reference to FIGURE 2. Assuming that the system of FIGURE 1 acts in a linear manner, then FIGURE 2 represents in a sufficient manner the transfer function equivalent circuit. For purposes of convenience, letter designations have been used to correspond with the various elements of the system of FIGURE 1.

Now considering the system of FIGURE 2 acting in the absence of variations, the following equations apply:

$$\frac{Vs}{Vr_1} = \frac{G1(1+G2)}{1+HG1(1+G2)} \quad (1)$$

$$\frac{V}{Vr2+Vs} = \frac{G2}{1+G2} \quad (2)$$

On the other hand, the coefficients of input and output regulation that take into account variation in input voltage and output current may be expressed as follows:

$$\frac{\Delta V_s}{\Delta V_e} = \frac{1}{1+HG1(1+G2)} \quad (3)$$

$$\frac{\Delta V_s}{\Delta 1s} = \frac{R}{1+HG1(1+G2)} \quad (4)$$

In these equations R is the output resistance $\Delta Vs/\Delta 1s$ in the absence of control.

Equations 1 and 2 define the stability and subordination conditions while Equations 3 and 4 define more specifically the performance characteristics of the device. In particular, these equations permit one to deduce that the performance will result almost exclusively from the characteristic of the first regulatory chain. The same characteristics will apply to variations caused by changes in temperature for which only the properties of the first regulatory chain will enter the picture.

Under the aforesaid conditions, the second regulatory chain can be of low accuracy. The regulator system, which is formed either of vacuum tubes or transistors and proportioned to supply maximum power $[(Vr2+E2)1s]$ (E2 being the maximum static variation resulting from lack of precision) can support temporarily a point of much higher power $[(Vr2+E2m)1s]$ during a period depending upon its construction, but always compatible with a band-pass of a few cycles per second. As appreciated by those skilled in the art, such variation is the dynamic maximum likely to occur.

Figure 3:
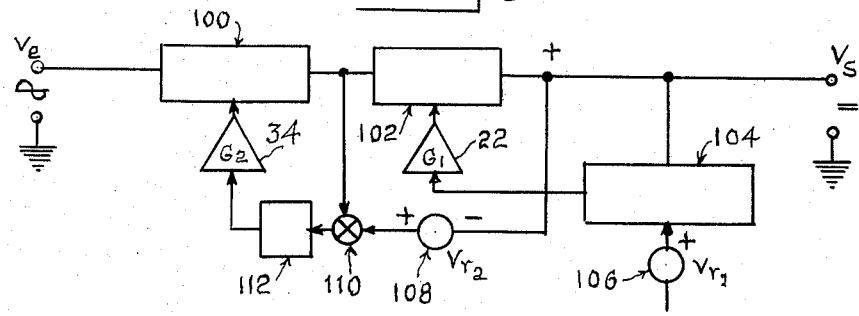

It has been found that in some instances, improved results can be obtained with the system of FIGURE 3, especially for regulating very high voltages. In this system, the rectifier and filter assembly is generally designated by the numeral 100, the regulator is generally designated by the numeral 102, the signal developing and comparison means which provides a feedback is generally designated by the numeral 104, the first reference potential is supplied by a means generally designated by the numeral 106, and the second reference potential is supplied by a means generally designated by the numeral 108. The construction of the comparator means 104 and the manner in which the first reference potential is supplied thereto will be considered in more detail herein below. However, it is important to note that in the embodiment of FIGURE 3, the second regulatory chain includes in addition to the comparison device 110 an oscillator 112 controlled thereby. The oscillator is controlled by a variation in voltage across the regulator means 102 and, in turn, the output therefrom is amplified by the amplifying means 34 and fed to the rectifying and filtering system 100. The oscillator output here, however, does not control the rectifier system, but supplies a variable and controlled actuating voltage. It should be understood that the principles described above, while applicable with advantage to providing highly regulated voltages of a thousand volts or above, are also applicable to low voltages. Thus, the principles of the embodiments described above can be applied to systems supplying a wide variation in output voltage, fluctuating from a few volts to thousands of volts with currents ranging from a few milliamperes to a few amperes.

Comparison means

In the foregoing discussion, reference has been made generally to an overall system constructed in accordance with the present invention. In FIGURE 2 particularly, it was suggested that a potentiometer might be used for purposes of deriving or developing a portion of the output signal to be fed back through regulatory chains for control of the system output. Nothwithstanding this suggestion, as pointed out above, the use of a potentiometer device has its limitations. Accordingly, the preferred embodiments of the invention utilize an improved form of comparison means provided hereby which is not subject to the disadvantages of potentiometer constructions.

More specifically, the method aspects of the invention provide a method of developing a measuring signal representative of the value of a continuous D.C. voltage, which method comprises the steps of alternately coupling a charge storage means with a conductor carrying the voltage in question and to a discharge path whereby a discharge signal is applied to such path, and applying a known signal having a polarity opposite that of the discharge signal to the path to develop a measuring signal representative of the difference between the known signal and the discharge signal. Further, the method provides for developing the known signal by alternating coupling another storage means to a known voltage supply and then to the discharge path simultaneously with coupling of the first mentioned storage means with the conductor and the discharge path respectively.

Figure 4:
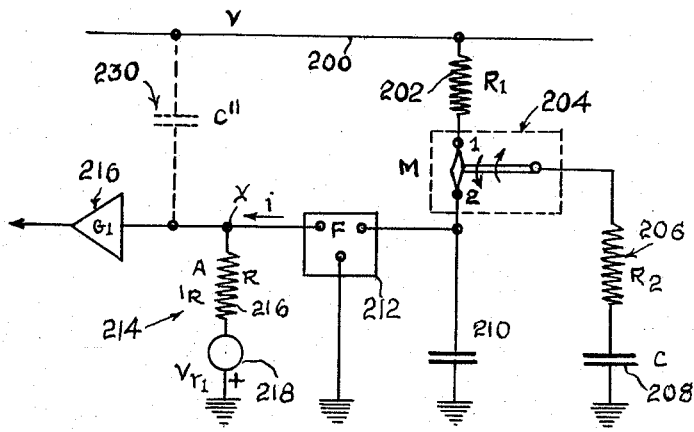

A suitable apparatus provided by the instant invention for carrying out the basic method as prescribed above is shown in FIGURE 4. If reference is made to that figure, it will be noted that the voltage $v$ carried on the conductor 200 can be passed through the resistance means 202 and the coupling means 204 to resistance 206 and the capacitor 208 coupled in series therewith. Alternately, the capacitor 208 and resistance 206 can be coupled through the switching or coupling means 204 with the capacitor 210. The capacitor 210 is linked with a suitable filtering system 212, the output of which is applied to a discharge path 214 comprising the resistance 216. Coupled in the discharge path is a reference source 218 which passes a current $i_r$ through the resistance 216 in opposition to the current fed to the discharge path via the output from the filtering means 212. The difference in currents causes a signal to be developed at the point $x$, which signal is applied to an amplifying means 216. The switching means 204, as suggested, alternately couples the capacitor 208 to the continuous high voltage carried on conductor 200, and to the comparison arrangement. These successive connections are established at a frequency $f$, and the switching means 204 effecting such connections may comprise a symmetrical vibrator or alternately, as explained in more detail below, a vacuum tube switching circuit. The resistances 202 and 206 are chosen at suitable values whereby only a preselected portion of the signal 200 is applied to the condenser 208 when the same is coupled with the line 200. The filtering arrangement is a conventional low pass filter whose role is to eliminate the continuous high frequency undulations in the discharge current obtained from the condenser 208. If $e$ represents the difference between the compared voltages, and if $Re$ represents the input resistance of the amplifier 216, then:

$$\frac{V_{218}}{R_{216}} + fc_{208}V - \frac{e}{Re} = 0 \qquad (5)$$

and $$V = -\frac{1}{fc_{208}}\left(\frac{V_{218}}{R_{216}} - \frac{e}{Re}\right) \qquad (6)$$

At equilibrium of the voltages, $e=0$. Accordingly, $$V_0 = \frac{V_{218}}{fCR} \qquad (7)$$

An increase $\Delta v$ from $V_0$ yields:

$$\Delta v = \frac{e}{fCRe} \qquad (8)$$

Any one of the Equations 5, 6 or 7 can be used for the measurement or for the control of the output voltage. However, in order to increase the precision of the measurement, it is recommended that operation be effected close to $V_0$, i.e. it is recommended that the gap or difference $e$ be very small. In this case, Equation 3 is applied, and the device thus operates as a zero type instrument.

It will be appreciated by those of ordinary skill in the art that the output of amplifier 216 may be applied to a suitable regulator type device to effect control of a regulated output voltage, or alternately, the output of the amplifier 216 may be applied to a suitable measuring instrument whereby the continuous high voltage carried by line 200 can be measured. For this reason, in the instant specification and in the appended claims, the term "measuring voltage" is used to designate a voltage representative of a voltage developed for either measuring or control purposes.

When the system of FIGURE 4 is utilized for purposes of regulation, then preferably a condenser such as that shown in phantom and designated by the numeral 230 is incorporated between the conductor 200 and the input to the amplifier 216, so as to increase the response speed of the regulating device for high voltage variations having a relatively high frequency.

While the system of FIGURE 4 represents a suitable arrangement for carrying out the basic method steps of the instant invention, the same is subject to certain limitations by virtue of the fact that the frequency of operation of the switching means 204 must be highly stable. More particularly, the characteristics of the system of FIGURE 4 are dependent upon the stability of the frequency of the operation of the switching means. Completely stable operation is difficult to achieve in many instances, and thus preferred embodiment of the invention contemplates the use of a system such as that shown in FIGURE 5 which is independent of the frequency of operation.

Figure 5:
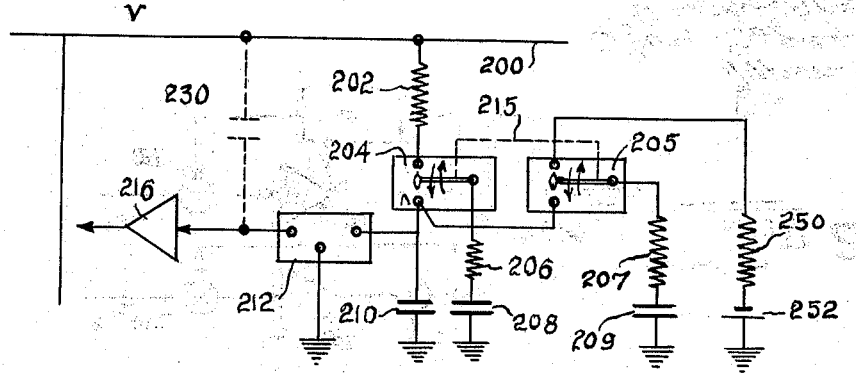

In the system of FIGURE 5, the left hand portion of the circuit thereshown corresponds identically with the system of FIGURE 4, except the discharge path 214 is eliminated and the condenser 210 provides in effect the discharge path itself. In addition, however, the circuit of FIGURE 5 incorporates the auxiliary arrangement comprising the capacitor 209 and series resistance 207 as well as the reference source 252 and resistance 250, and the additional switching or coupling means 205.

With the system of FIGURE 5, the condenser 208 is alternately coupled by the switching means 204 with the conductor 200 and then with the condenser 210 and the input to the filtering system 212. Simultaneously with this operation, the condenser 209 is coupled by means of the switching device 205 with the reference source 252 while the condenser 208 is coupled with the line 200, and then with the capacitor 210 and input to the filtering means 212 when the capacitor 208 is coupled thereto. In other words, the switching means 204 and 205 operate simultaneously by the mechanical connection 215 established therebetween. To repeat, when the capacitor 208 is coupled with the line 200, then the capacitor 209 is coupled with the reference source. When, however, the capacitor 208 is coupled with the discharge path, then the capacitor 209 is similarly coupled thereto. It will be understood that the signal applied to the discharge path by the capacitor 209 opposes the signal applied thereto by the capacitor 208. Thus, if there is perfect regulation the signals are equal, and no output is fed from the filter 212 to the amplifier 216. However, if there be a difference between the signals applied to the discharge path by the respective capacitors 208 and 209, then a signal is fed to the amplifier 216. This signal may serve to cause regulation within a regulatory system, or alternately, it may be applied to a measuring device so as to indicate the value of the continuous high voltage to be measured. Of course, the signal can be used both for measurement and control.

The system of FIGURE 5 has an advantage over the system of FIGURE 4 in that the system of FIGURE 5 is independent of frequency. Let $C$ and $C'$ represent respectively the capacities of the condensers 208 and 209, and let $f$ designate the common frequency of operation of the switching means 204 and 205. At equilibrium of the respective signals applied to the discharge path, $$fCV_0 = -fC'Vr \qquad (9)$$

or $$V_0 = \frac{C'Vr}{C} \qquad (10)$$

Thus, it should be apparent that the system of FIGURE 5 operates independent of frequency. As with the system of FIGURE 4, in the system of FIGURE 5, if one wishes to use the comparison device in a control system, then a suitable condenser such as that designated by the numeral 230 is preferably coupled between the line 200 and the input to the amplifier 216.

It should be appreciated by those of ordinary skill in the art that a change in the output voltage to be measured or to be regulated can be obtained by modifying the value of condenser 209 or alternately by modifying the value of the reference source 252.

In the systems of FIGURES 4 and 5, the numerals 204 and 205 have been used to generically designate a switching means or a means for coupling the various elements in the stated manner. These means may be either electromechanical in nature, or electronic in nature.

Figure 6:
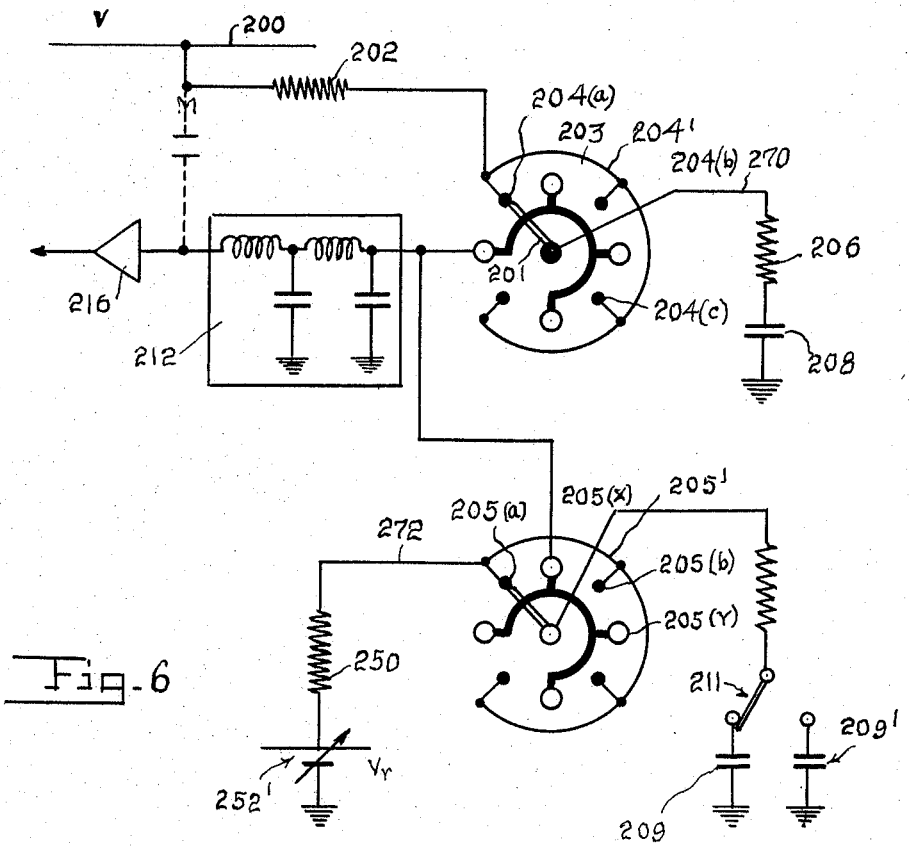

FIGURE 6 presents the system of FIGURE 5 as incorporating switching or coupling means of suitable electro-mechanical in nature. By referring to FIGURE 6, it will be noted that the numerals used for the various elements thereof correspond with the numerals used in the system of FIGURE 5. Prime numerals are used to designate the switching means 204 and 205, and similarly prime numeral 252 is used to designate a variable reference source, and prime numeral 209 is used to designate another capacitor which may be coupled in the system by means of a switch 211 for purposes of varying the output voltage to be regulated or to be measured. In other words, with the source 252, a variation in the reference tension may be achieved, and similarly, with a provision of switch 211 and auxiliary condenser 209', a variation in the comparison condenser can be achieved.

The switching means 204' and 205' represent mechanical relays of the rotating commutator type. Each of these switching means is provided with a first group or plurality of contacts 204a, 204b, etc. and 205a, 205b, etc. and a second group of contacts, 204w, 204x, etc. and 205w, 205x, etc. The contacts 204a, 204b, etc. are coupled by means of the conductor 203, and through the resistance 202 with the line 200 whereas contacts 205w, 205x, etc. are coupled to the input of filtering means 212. The movable contact arm of the switching means 204 which is designated by the numeral 201 is coupled via the conductor 270 through the resistance 206 with the condenser 208.

Similarly, the various contacts 205a, 205b, etc. are coupled by means of the conductor 272 with the reference source 252' and the movable contact arm 274 of switching means 205 alternately couples the contacts 205x, 205y, and 205z, etc., to the input to the filter means. The movable contact arm 274 alternately reaches each of the contacts so as to establish the desired circuit conditions.

Figure 7:
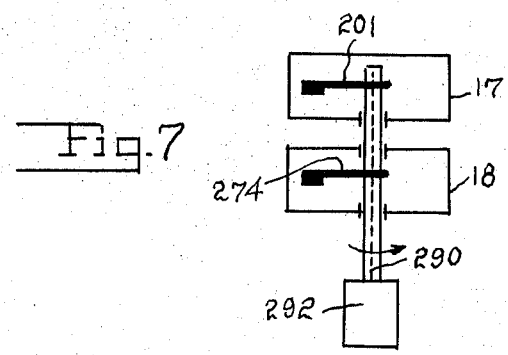

Simultaneous operation of the switching means 204' and 205' may be achieved by fixing the arms 201 and 274 on a common shaft such as that designated generally by the numeral 290 in FIGURE 7, and by driving such shaft with a suitable motor such as that designated by the numeral 292. While only schematic representation has been used in FIGURE 7, it will be apparent that any classical construction can be used for the commutator without departing from the scope and spirit of the invention.

With a rotating commutator type construction, it is easy to obtain a speed of 3000 r.p.m. which, in the device illustrated corresponds to a frequency of 200 periods per second (3000 turns per minute=50) turns per second and each commutator has 4 positions).

As in the case of other constructions, when the system of FIGURE 6 is used for purposes of control, then it is desirable to couple a suitable capacitance shown in phantom between the terminals $m$ and $n$ of the system for purposes of stabilization. It has been found that the system of FIGURE 6 permits one to obtain measurement or control of voltages between 5 and 50,000 volts and more.

Figure 8:
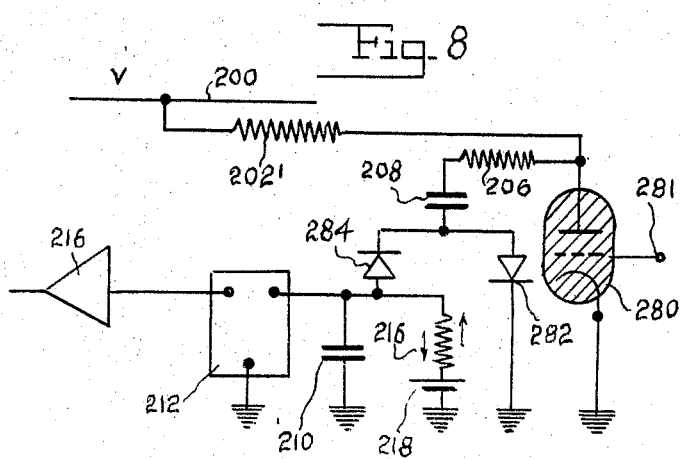
Figure 9:
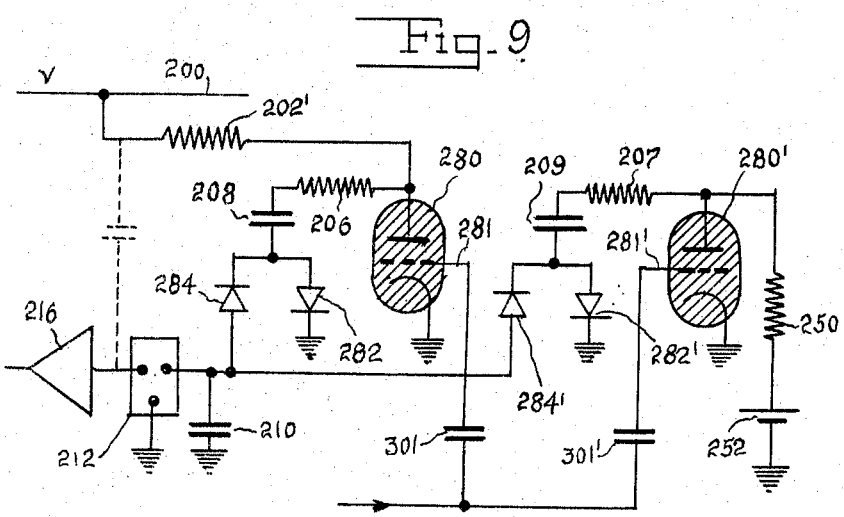

While FIGURES 6 and 7 present a suitable arrangement which provides for the desired results contemplated by the invention, another modification which can be used in accordance herewith is presented in FIGURES 8 and 9.

FIGURE 8 represents a system corresponding to that shown in FIGURE 4 wherein electronic means is used as the switching means 204. By referring to FIGURE 8 it will be noted that a thyratron 280 is there provided. Such thyratron has a grid 281 to which can be applied a firing signal of a frequency $f$. The thyratron is preferably filled with hydrogen or the like and its plate circuit is coupled through resistance 206 with the condenser 208 and then to the rectifying combination comprising diodes 282 and 284. The system of FIGURE 8 functions similarly to the system of FIGURE 4, but in detail operates as follows: In the first phase, the thyratron 280 is not conductive and a low potential appears at its plate. The condenser 208 accordingly charges through resistances 202' and 206 and during this period the plate potential of the thyratron increases. In the second phase, through the action of the signal applied to the grid 281, the thyratron fires and its plate potential drops abruptly causing condenser 208 to discharge on the one hand through the resistance 206, the thyratron and its cathode, and on the other hand through the diode 284. The thyratron is then extinguished, and the cycle starts again.

Under these conditions, a discharge current $i$ flows from condenser 208 through the discharge path including resistance 216, and this current has value proportionate to (1) the valve of the condenser 208, (2) the frequency of the signal applied to the thyratron, and (3) the value of the high voltage appearing on line 200. More specifically $i=fCV$. From the comparison of the discharge current with the reference current supplied by the reference source 218, one obtains a comparison or measuring voltage $v$.

Although the system of FIGURE 5 functions satisfactorily, as suggested, the frequency of operation of the thyratron must be highly stabilized for any degree of accuracy, and although highly stabilized frequency can be achieved, the same necessarily means increased expense and the incorporation of components of higher accuracy. Accordingly, the preferred embodiment of the invention contemplates utilization of the circuit of FIGURE 9 which operates in the same manner as the circuit of FIGURE 5. To avoid repetition, corresponding numerals have been used in the circuits of FIGURES 5 and 9. The difference between the circuit of FIGURE 9 and the circuit of FIGURE 8 lies in the provision of the auxiliary condenser means which can be coupled with a reference source, and the provision of a switching means for coupling the same thereto. The system incorporates a thyratron 280' identical with the thyratron 280 and having its grid 281' coupled with the grid 281 for simultaneous application of an input signal. Condensers 301 and 301' are provided on the input as conventional.

The operation of the thyratron 280' is identical with the operation of the thyratron 280, except for the fact that the condenser 209 charges itself from the reference source 252, whereas the condenser 208 charges itself from the voltage appearing on the line 200. Otherwise, operation is identical and the system functions in the manner explained in connection with FIGURE 5.

Since only a portion of the high voltage signal appearing on line 200 is applied to the condenser 208, the reference source 252 may be of low value, and in this instance, the thyratron need not necessarily be filled with hydrogen, by may, for example, be filled with xenon.

With the circuit of FIGURE 9, if C and C' represent respectively the capacities of condensers 208 and 209, and $V_r$ represents the voltage applied by the reference source 252, then with equilibrium of the currents in the discharge path, i.e. with equal signals applied to the condenser 210, the conditions of Equations 9 and 10 exist, and thus, the system of FIGURE 9 operates free of any frequency variation, and the problems connected therewith. Similarly, as with prior systems, if one wishes to use the system of FIGURE 9 for stabilization purposes then it is desirable to connect the capacitor shown in phantom between the line 200 and the input to the amplifier 216.

*Detailed consideration of overall regulation system*

In the overall system of FIGURE 3, the detailed expedients of both of the regulatory chains are essentially identical in form. The amplifier 22 in the first regulatory chain preferably comprises a two transistor system operating on an average germanium frequency. The amplifier 34 similarly is of transistor design and preferably comprises four transistors on a low germanium frequency. The reference source of the first regulatory chain preferably consists of a Zener diode.

Depending upon the maximum current output desired, as well as the maximum voltage desired, the regulatory expedient may comprise either a transistor such as type 2n1021, or alternately a vacuum tube such as type EL84. With the utilization of a transistor regulating organ, an output voltage controllable from 1 to 3 kv. with an output current 300 milliamps can be obtained. When a vacuum tube is used for purposes of control, then the output voltage is controllable from .4 to 5 kilovolts and the output current can be maintained at 15 milliamps.

As explained hereinabove, the system of FIGURE 3 is in certain respects similar to the system of FIGURE 1 in that it incorporates a double regulatory action or two regulatory feedback chains. However, the system of FIGURE 3 differs from the system of FIGURE 1, in that an oscillator is incorporated which is independently controlled and which supplies the high alternating voltage. In the system of FIGURE 3, it should be understood that the second regulatory chain does not act upon the rectification system per se, i.e. upon thyratrons for example, but instead acts on the oscillator 112 which, after amplification, emits a high alternating voltage which is then rectified by the rectifying organs. The oscillator 112 preferably operates with a frequency of the order of 20,000 cycles per second and the amplifier 34 which is coupled to the output of the oscillator preferably comprises a transistor construction with low germanium frequency. The amplifier 22 of the system of FIGURES 1 or 3 preferably is also of transistor design. The reference sources in the preferred embodiment comprise diodes as suggested above. It has been found that such diodes compensate for temperature changes in the transistors, and thus temperature variations do not affect operation of systems provided hereby. The system of FIGURE 3 has in addition to the advantage of providing for instance an output controllable from 1 to 50 kilovolts, with a load of 4 milliamps, the advantage of possessing independent operation of the second regulatory chain, and the resulting advantage of requiring a minimum of parts.

In order to more fully comprehend the detailed construction and operation of an overall system, reference should be made to FIGURE 10 which constitutes a particularly demonstrative system of the possibilities of the double feedback regulator and presents a system corresponding to the general system shown in FIGURE 3 above. In the system of FIGURE 10, the numeral 401 generally designates a high voltage rectifier and the numeral 402 generally designates the high voltage filter. These elements correspond to the rectifier and filter systems generally designated by the numeral 100 in FIGURE 3. Coupled with the output of the filter 402 is the regulator tube 403 which corresponds with the regulator element generally designated by the numeral 102 and the construction of FIGURE 3.

The reference source corresponding to that designated by the numeral 106 in FIGURE 3 is provided in the system of FIGURE 10 by the arrangement generally designated by the numeral 404. The numeral 405 of FIGURE 10 designates the vacuum tube preamplifier system which is used here and corresponding to that designated by the numeral 22 in FIGURE 3. The comparative organ 104 of FIGURE 3 is designated by the same numeral in FIGURE 10.

The numeral 408 of FIGURE 10 designates the preferred system utilized to provide the second reference voltage designated by the numeral 108 in the system of FIGURE 3. The oscillator 112 of FIGURE 3 preferably comprises a construction generally designated by the numeral 409 in FIGURE 10 and the power amplifier designated by the numeral 34 in FIGURE 3 preferably comprises the construction designated by the numeral 410 in FIGURE 10. The input to the system of FIGURE 10 is fed through the rectifying system 411. The numerals 412 and 413 in FIGURE 10 generally designate auxiliary sources of supply which are coupled with the various tube elements in the manner shown by corresponding letters attached to the respective arrow heads. Filament voltage is obtained in the input provided by the rectifying and filter system 422, and a safety cut-off 423 is incorporated. A relay operated switching means 424 is provided for purposes of controlling initiating input feed to the system.

The rectifying system 401, as shown, preferably comprises a series of silicum high voltage diodes which are mounted in a voltage doubling bridge. This is conventional construction and similarly the filter system 402 preferably consists of a conventional $\pi$ type filter incorporating series resistance and parallel capacitor elements. The input condensers of the filter systems are used also as part of the voltage doubler.

The voltage regulator 403 preferably comprises in the embodiment shown in FIGURE 10 a pentode which has a comparatively high plate potential but which possesses the advantage of simple protection by a spark gap due to its effective plate cathode insulation. The principle reference voltage is supplied by the system designated by the numeral 404 which here comprises a stabilized supply of medium voltage with low power. This supply, of the standard type, but which comprises the temperature compensating means, which will be further described, in order to obtain a very high stability uses as a reference a Zener diode 425, and moreover, the supply is provided with a variable resistance element 426 for varying the base potential of the transistor 427. Of course, the transistor 427 serves as the input stage of the preamplifier provided in the first regulatory chain of the overall system and designated by the numeral 404, and the variable resistance 426 permits adjustment of the amplifying stage and thus of the reference source. More particularly, by virtue of incorporation of the variable resistance element, the high voltage comparison means 104 can be maintained at a fixed ratio. Moreover, the output voltage can be read on a low voltage volt meter of good quality. Such a volt meter can be plugged-in across the terminals 428. Still in additional advantage of utilizing the adjustable reference system 404 is that the reference voltage can always have a sufficiently high value so as to compensate for shifts in the detector stage 405 whereby the same may be neglected.

It is important to note that the use of the high stability power supply 404 permits the use of a vacuum tube amplifier stage, as designated by 405, without any compensation for ambient temperature.

The detector stage or preamplifier 405 as shown, comprises two pentodes, the input stage being provided by pentode 428 which possesses a very low grid current. Tubes of this type, for example, EF86 are conventional.

The high voltage comparison means, or means fo developing a portion of the output signal to be fed back generally designated by the numeral 104 may take on various forms. One such form is shown in FIGURE 10a wherein the element is shown as comprising a plurality of fixed resistors in series which serve to form the high voltage arm of the input bridge. Preferably two resistors identical to the series resistors forming the arm 430 are mounted in parallel fashion and serve to constitute the low voltage arm of the bridge.

An alternate construction to that shown in FIGURE 10a is the system presented and described above with respect to FIGURE 5, and still an additional alternative is the utilization of the system is explained and described above in connection with FIGURE 9.

As appreciated by those of ordinary skill in the art, the output capacitor 407 must be of a suitable value according to the bandwidth of the system. The selection of the desired capacitive element can be made in manners well-known to those skilled in the art, and thus detailed discussion thereof is believed unnecessary. Similarly, the exact type of system used for the regulator generally designated by the numeral 408 need not be explained in detail since various systems may be incorporated. In the case of FIGURE 10 two gas tubes are used which are coupled with the control grids of the power amplifier 410.

The pilot oscillator comprises a detector stage generally designated by the numeral 442 which detects the variation, and an oscillator which provides an output which in turn will compensate for such variation. The construction of the detector and oscillator are somewhat standard and detailed discussion thereof is also believed to be unnecessary. Similarly, the power amplifier 410 comprises a driver stage class A amplifier and an output stage operating in class B push-pull fashion. The supply sources 411, 412 and 413 are also of conventional design and detailed consideration need not be given thereto. The protective device 423 is responsive to an arcing across the spark gap generally designated by the numeral 424 and serves to shut-off the system in the event of a short circuit.

When adjustment of the voltage is made by adjustment of the resistance 426 of the first reference source 404, then there is a change in the potential across the terminals 28 of such a system. Such change in potential results, by virtue of the coupling of the output terminals thereof with the relay of the switching means 424, in operation of such switching means whereby the power supplied to the system components is suitably adapted for operation at the adjusted voltage. In other words, a change in the potential across the terminals 28 of the reference source 404 causes operation of the relay means 424 and adjustment of the power fed to the system for suitable operation at the newly defined voltage.

While FIGURE 10 has been presented as an example of an overall system constructed in accordance with the present invention, it should be apparent that various modifications can be made thereto so as to adapt the system particularly for use within a given range of about voltages or output currents. Thus, for example, the regulator section, as suggested above may be replaced with a transistor type expedient. Similarly, other components of the system can be suitably modified to provide for a desired result in a given circumstance.

*Temperature compensation*

A manner of compensating for the effect of temperature on the output voltage of stabilized supplies lies within the scope of the instant invention as suggested above.

As a matter of fact, the principal elements characterizing a stabilized supply relate on the one hand to the coefficient of regulation above defined by the ratio of relative fluctuations of input voltage to the relative fluctuations of output voltage, on the other hand, to the internal resistance defined by the ratio of variations in output voltage to the corresponding variations in the charge current. An additional factor, however, concerns the deviations due to disturbances outside the system, among which the most important, particularly for devices using semiconductors, is the influence of temperature.

For the first two characteristics, as shown by the equations set forth above, it is easy, in most cases, by a suitable choice of the gain for the first regulatory chain, to obtain suitable values—very high for coefficient of regulation and very low for the internal resistance, all while functioning under good conditions of stability in the sense of no oscillation.

Contrariwise it appears, at first sight, more delicate to reduce, or even eliminate the deviations due to the effects of temperature; and the small number of stabilized supplies produced with industrial transistors evidences the importance of this difficulty. However, the present invention provides a quasi-automatic method for compensating these effects.

First of all, the invention realizes that disturbances due to temperature variations, provoking a unwanted deviation in output of a given stabilized supply, result from variations within the source of reference voltages. More specifically temperature problems affect reference source and comparison means of FIGURE 2, for example, most seriously.

In fact, the possible effect of temperature on the other elements of the first regulatory chain or on the series regulator element is automatically corrected by operation of the whole system. Moreover, temperature effects on the elements of the second regulatory chain is much less important in view of the small precision demanded of this chain. As shown above only the first chain need be taken into consideration for problems concerning the search for high stability.

As for the comparator element, it is the designer's job to make it behave in stable and reliable fashion whatever the disturbances to which it may be subjected. It goes without saying that in the case of a potentiometer-type divider, one would endeavor to select the constituent resistances of the two arms of the conventional input bridge in such a way that any variation in temperature will be practically compensated. This merely means suitably choosing the coefficient of variation of the resistivity as a function of the temperature for the various elements. This is a classic solution and needs no further elaboration.

Figure 11:
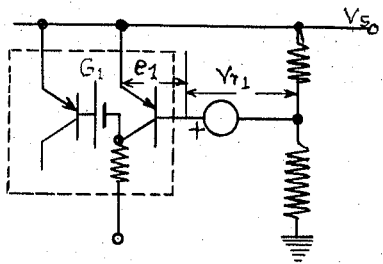

There remains, consequently, the consideration of the action of temperature on the reference voltage and on the comparison means; that is to say, on the total voltage which is actually amplified by the preamplifier $G_1$ (FIGURE 2) or 22 (FIGURES 1 and 3). This voltage, which conditions the stability of the regulator, comprises two terms, the one $V_{r1}$ corresponding to the reference source proper, the other, $e_1$ corresponding to the emitter base voltage of the first transistor which acts as the comparison means as suggested above. (See FIGURE 11 which presents the basic circuit diagram for the preferred form of amplifier used.)

Thus, if one wishes to compensate for the effect of temperature on a voltage regulator, the sum $V_{r1}+e_1=Ve$ should remain perfectly constant, whatever the variation of temperature.

Moreover, the classic solution, which comes to mind immediately, consists in reducing the possible variation of the voltage $Ve$ by assuring a careful thermal selection of the "reference voltage" cell. This method, although it assures only partial compensation, can be used with advantage in certain cases, particularly when one is not looking for a very high stability for the regulator. On the contrary, it cannot be used when one is aiming for a very high stability feed: it would actually be necessary to provide a correct thermostat, which is rather delicate to obtain since one would need temperature adjustment to better than 0.05° C.

In light of the above, the instant invention relies on the behavior of the elements used as sources of references (mainly Zener effect diodes) or as preamplifiers (transistors), and provides a particularly effective method of compensation, the application of which is relatively easy, as explained below.

A Zener diode is a silicon diode whose current-voltage characteristic has generally the slope presented in FIGURE 12. Since the diode is polarized in the opposite direction, the current rises abruptly from $10^{-9}$ to $10^{-3}$ amps for a voltage called the Zener voltage which remains practically constant. In this zone the dynamic resistance:

$$R_z = \frac{\Delta V_z}{\Delta I_z} \quad (11)$$

is on the order of several ohms.

The deviation of an element as a function of the temperature is the law of variations of this element with respect to this factor, all other parameters being assumed constant. Applied to a Zener diode, the deviation can be defined as the variations in its Zener voltage as a function of the temperature when the output through the diode is kept constant.

Figure 13:
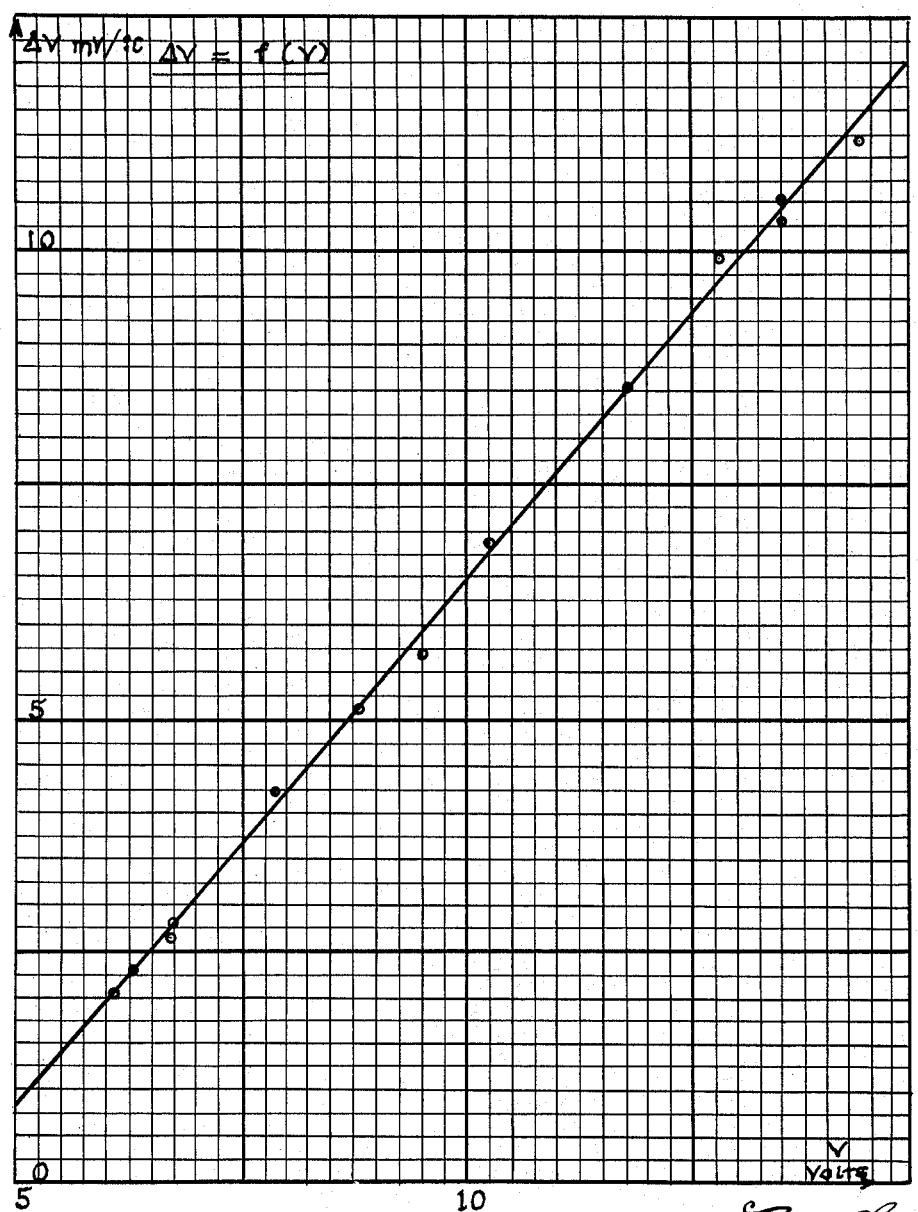

For Zener diodes, we have found that $\Delta V_z$ expressed in mv./° C. as a function of $Vz$; we obtain a straight line such as shown in FIGURE 13.

The equation of this straight line is:

$$\Delta V_z = 1.13 V_z - 4.82 \pm 0.15 \quad (12)$$

in which $\Delta V_z$ is expressed in mv./° C. and $V_z$ is expressed in volts.

Note that this relation is valid for Zener voltages comprised between 6 and 15 v. This is of utmost importance in the following because it permits selecting the most suitable diode with allowance for the linear variation desired.

In summary, we have found that Zener diodes, when used as a source of reference provide:

(a) good stability in time, and
(b) a deviation of Zener voltage which is a linear function of the temperature.

Now, examining transistor operation, consider FIGURE 14, which presents a transistor of the PNP type in which:

(a) $I_E$, $I_C$ and $I_B$ designate the currents measured outside the transistor in the emitter (E), base (B) and collector (C) connections respectively (b) $I_\sigma$ designates the inverse current of the collector-base junction (c) $\alpha$ designates the fraction of the emitter current which passes through the collector. $(1-\alpha)$ is consequently the fraction of the emitter current passing through the base.

We have found the influence of temperature on these factors to be as follows:

(1) The base-emitter voltage $V_{BE}$ varies linearly with the temperature (the coefficient being negative $$\Delta V_{BE} \approx -22$$

to $-2.5$ mv./° C. according to the transistor).

(2) The inverse current of the base-collector junction $I_\sigma$ varies exponentially with the inverse of the absolute temperature.

(3) The true base current $I'B = (1-\alpha)I_E$ which is equal to the sum of the base current measured IB and the current $I_\sigma$:

$$I'B = IB + I\sigma \quad (13)$$

varies linearly with the temperature.

FIGURE 15 presents schematically the first section of a comparison means provided hereby between the reference voltage, and output voltage connection source.

FIGURE 16 presents an equivalent circuit for that of FIGURE 15, wherein R represents the resistance equivalent to the divider bridge.

The causes of the deviation as a function of the temperature are of two kinds:

(1) Linear deviation of $\Delta V_{BE}$ and $\Delta(I_\sigma + I_B)$.
(2) Exponential deviation of $I\sigma$.

for no variation:

$$\Delta V_z + \Delta_{BE} + R\Delta(I_B + I_\sigma) = 0 \quad (14)$$

For a given transistor, $\Delta_{BE}$ and $\Delta(I_B + I_\sigma)$ are known or at least measurable since the resistance R can be calculated. By application of Formula 12 one can calculate the Zener voltage which suits the transistor selected, as a result, one either has a diode which has the Zener voltage desired and the problem is solved or one does not have such a diode. However, in the latter instance, one can still compensate the transistor using the Zener diode on hand (as long as its voltage is not inferior to the one calculated) and a thermistance.

Note, however, that in the hypothesis in which the time factor is not critical, one can now obtain Zener diodes whose Zener voltage is defined within 0.1 v.

The balance of linear deviations is given by $$\Delta V_{BE} + R\Delta(I_B + I_\sigma) = \Delta V_z \quad (15)$$

Adding a supplementary linear deviation, we have:

$$\Delta V_{BE} + R\Delta(I_B + I_\sigma - a) = \Delta V_z \quad (16)$$

The current $a$ can be supplied by a thermistance in accordance herewith.

Figure 17:
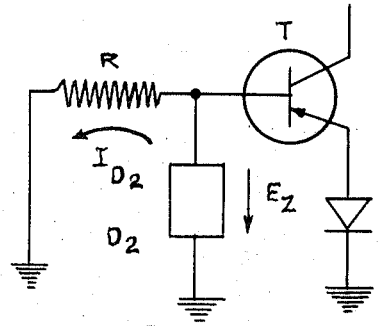
FIGURE 17 is a schematic diagram of showing the manner in which the circuit of FIGURE 15, for example, may be modified to provide for additional temperature compensation.
Figure 18:
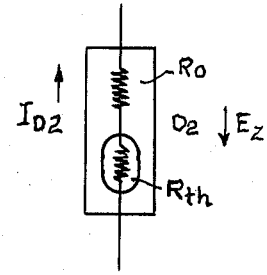
FIGURE 18 is a fragmental detailed schematic representation of a circuit arm which can be utilized within the circuit of FIGURE 17.

Consider FIGURE 17 which represents a modification of the circuit of FIGURE 15 wherein a dipole D2 is coupled to the base of the transistor T. The dipole D2 is adapted to effectively supply a current which compensates for variations in the transistor current resulting from variations in temperature thereof. FIGURE 18 presents the preferred construction of the dipole D2. It comprises a basic resistance R, and a thermistance $R_{th}$. The thermistance, in well-known manner, varies with temperature and effectively results in varying the base current $I_B$ of the transistor. This variation is represented by the current $I_{D2}$ in FIGURE 18, and this effective current opposes the base current $I_B$, thus compensating for changes therein.

Figure 19:
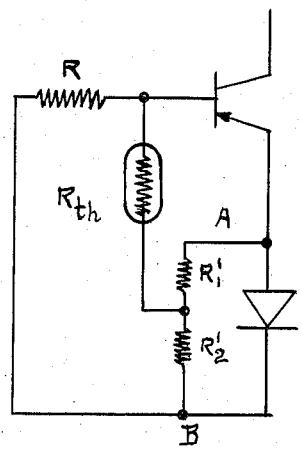
FIGURES 19, 20 and 21 are schematic circuit representations showing in detail different modifications which can be made to the circuit of FIGURE 15 to effect complete accurate temperature compensation thereof.
Figure 20:
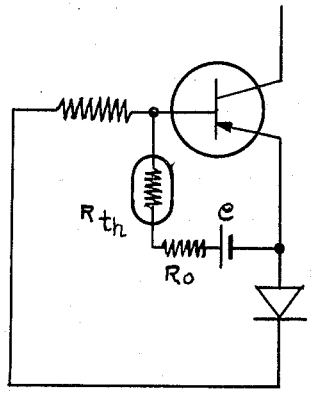
Figure 21:
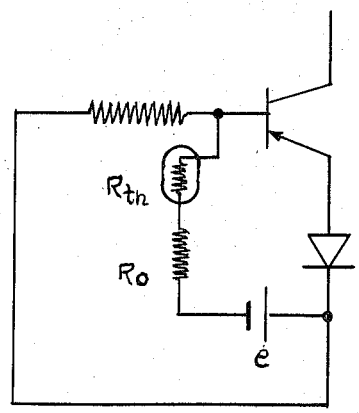

In order to achieve an exact compensation for variations in temperature, i.e., in order to obtain a linear compensation the arrangement of FIGURE 19 is preferred. In this figure, the thermistance $R_{th}$ is coupled with the voltage divider consisting of $R_{1'}$ and $R_{2'}$ so that the proper voltage relationship for linear variation is obtained. The arrangements of FIGURES 20 and 21 which utilize an auxiliary battery $e'$ are the equivalents of the circuit of FIGURE 19 as should be readily apparent to those of ordinary skill in the art.

While the foregoing discussion considers the possibility of using a Zener diode itself as a source of reference voltage which temperature compensates a transistor comparison means, and while such discussion further considers the utilization of a thermistance in the reference source-comparison means arrangement to effect temperature compensation, still further compensation can be obtained particularly for $I_c$ with the arrangement schematically represented in FIGURES 22 and 23. In these figures, a diode $d_1$ serves to inject in R a current that is equal and opposite in sign to $I_c$. The diode is selected so as to have the same saturation current and the same current variations as the transistor T, or alternately resistances are coupled with such diode to provide the branch shown in FIGURE 23 so that exact compensation is obtained. It should be noted that with the branch a–b of FIGURE 23 incorporated in the circuit of FIGURE 22 the effect of R can essentially be ignored for purposes of calculating the desired resistance values.

The methods of compensation for temperature variations within, or of a semi-conductive comparison means or amplifying means discussed above are based on knowledge of temperature variations of the semiconductor elements as well as the reference sources. The compensations achievable can be both linear and non-linear so as to effect complete and accurate regulation and compensation.

It will be appreciated by those skilled in the art that the particular values selected for any given component depends on the characteristics thereof under temperature variation. Thus, by suitable testing of the characteristics of the type of components to be used in particular embodiments, one can ascertain the exact variations which must be compensated. Having these variations in mind, by standard mathematical calculation, one can determine the exact values of the compensation elements. Of course, a plot or graph of the characteristics of the elements is particularly helpful in making the selection of particular components.

Should, in operation of the devices provided hereby, one find that a prolonged "warm-up" time of the comparison means or amplifier is necessary for stable operation, then the invention provides for passing a current of ten or more milliamperes through the emitter base junction and associated elements to place the same in normal operating condition.

*Conclusion*

After considering the foregoing detailed description of the illustrative and preferred embodiments of the invention, it should be apparent that the objects set forth at the outset of this specification have been successfully achieved. It should also be apparent that various modifications other than those specifically suggested herein can be made to the systems and methods without departing from the scope and spirit of the invention. Accordingly,

What is claimed is:

1. A method of developing a measuring signal representative of the value of a continuous D.C. voltage comprising the steps of alternately coupling a charge storage means with a conductor carrying said voltage and to a discharge path whereby a discharge signal is applied to said path, and applying a known signal having a polarity opposite that of said discharge signal to said path to develop a measuring signal representative of the difference between said known signal and said discharge signal 2. The method defined in claim 1 and further including the step of developing said known signal by alternately coupling another storage means to a known voltage supply and then to said discharge path simultaneously with coupling of the first mentioned storage means with said conductor and discharge path respectively.

3. A method of developing an electrical signal representative of the value of a continuous D.C. voltage, said method comprising the steps of alternately coupling a charge storage means with a conductor carrying said voltage and to a discharge path whereby a discharge current flows from said storage means through said path, and passing a known current through said path in a direction opposite that of said discharge current to develop a signal representative of the difference between said known current and said discharge current.

4. Apparatus for developing a measuring signal representative of the value of a continuous D.C. voltage carried by a conductor, comprising, in combination, a main condenser means, impedance means providing a discharge path, means for alternately coupling said main condenser means to said conductor and said discharge path respectively, means for applying a known signal to said discharge path of opposite polarity to that applied when said condenser means is coupled to said path, and means for deriving a measuring signal from a point on said discharge path.

5. Apparatus for developing a measuring signal as defined in claim 4 and further including means coupled to said discharge path for amplifying the effective signal developed in said path.

6. Apparatus for developing a measuring signal as defined in claim 5 and wherein said means for applying a known signal comprises means providing a known voltage and auxiliary condenser means, and wherein said apparatus further includes means for coupling said auxiliary condenser means to said means providing a known voltage and to said discharge path simultaneously with coupling of said main condenser means to said conductor and said discharge path respectively.

7. Apparatus for developing a measuring signal as defined in claim 6 and further including filter means coupled between said discharge path and said means for amplifying.

8. Apparatus for developing a measuring signal as defined in claim 7 wherein said means for coupling comprises a pair of switching means each having a movable contact arm, and wherein said arms are mechanically coupled together for simultaneous movement.

9. Apparatus for developing a measuring signal as defined in claim 7 wherein said means for coupling comprises electronic valve means.

10. Apparatus for developing a measuring signal as defined in claim 9 wherein said electronic valve means includes rectifier means and gas tube means, said rectifier means being coupled between said main condenser means and said discharge path and said auxiliary condenser means and said discharge path, said tube means being coupled with said main and auxiliary condenser means to discharge said condenser means through said discharge path.

11. Apparatus for developing a measuring signal as defined in claim 10 wherein said gas tube means comprises at least a pair of thyratrons coupled to a common input connection for simultaneous firing by an applied firing signal.

12. Apparatus for developing a measuring signal as defined in claim 5 and further including filter means coupled between said discharge path and said means for amplifying.

13. Apparatus for developing a measuring signal as defined in claim 12 wherein said means for coupling comprises electronic valve means.

14. Apparatus for developing a measuring signal as defined in claim 13 wherein said electronic valve means includes rectifier means and gas tube means, said rectifier means being coupled between said condenser means and said discharge path and said tube means being coupled to said condenser means to discharge said condenser means through said path.

(References on following page)

References Cited by the Examiner

UNITED STATES PATENTS

| | | | |
|---|---|---|---|
| 2,603,689 | 7/1952 | Stevens et al. | 324—111 |
| 2,615,063 | 10/1952 | Brown | 324—111 |
| 2,618,674 | 11/1952 | Stanton | 324—111 |
| 2,619,514 | 11/1952 | Stanton | 324—111 |
| 2,750,547 | 6/1956 | Wannamaker et al. | 324—111 |
| 2,858,498 | 10/1958 | Norris et al. | 321—18 |
| 2,931,969 | 4/1960 | Hilker | 323—66 |
| 2,942,172 | 6/1960 | Holtje | 323—22 X |
| 2,956,179 | 10/1960 | Yragui | 307—88.5 |
| 2,967,992 | 1/1961 | Scholten | 323—666 |
| 3,010,072 | 11/1961 | Van Emden | 321—18 |
| 3,037,159 | 5/1962 | Brown | 321—18 |
| 3,050,644 | 8/1962 | Ironside | 307—88.5 |
| 3,068,392 | 12/1962 | Santelmann | 321—18 |
| 3,075,146 | 1/1963 | Wood | 342—111 |

LLOYD McCOLLUM, *Primary Examiner.*

MILTON O. HIRSHFIELD, *Examiner.*

A. J. GAJARSA, D. L. RAE, *Assistant Examiners.*